United States Patent [19]

Barber

[11] Patent Number: 5,696,703

[45] Date of Patent: Dec. 9, 1997

[54] METHOD AND APPARATUS FOR NON-CONTACT TEMPERATURE MEASUREMENT

[75] Inventor: Roy Barber, Sheffield, United Kingdom

[73] Assignee: Land Instruments International Ltd., Sheffield, United Kingdom

[21] Appl. No.: 447,623

[22] Filed: May 23, 1995

[51] Int. Cl.$^6$ .................. G01J 5/00; G01J 5/62; G01B 11/06
[52] U.S. Cl. .................. 364/557; 374/126; 374/128; 374/121; 374/133
[58] Field of Search .................. 374/9, 126, 127–131, 374/132, 121, 133; 364/557; 128/664; 250/736, 339.04

[56] References Cited

U.S. PATENT DOCUMENTS

| | | | |
|---|---|---|---|
| 4,924,478 | 5/1990 | Tank | 364/557 |
| 4,974,182 | 11/1990 | Tank | 364/557 |
| 4,980,847 | 12/1990 | Hirano | 364/557 |
| 5,021,980 | 6/1991 | Poenisch et al. | 364/557 |
| 5,173,868 | 12/1992 | Kalley et al. | 364/557 |
| 5,219,226 | 6/1993 | James | 374/124 |
| 5,272,340 | 12/1993 | Anbar | 250/332 |
| 5,564,830 | 10/1996 | Bobel et al. | 374/126 |

FOREIGN PATENT DOCUMENTS

| | | |
|---|---|---|
| 0384682 | 8/1990 | European Pat. Off. |
| 0420108 | 4/1991 | European Pat. Off. |
| 1648233 | 1/1972 | Germany. |
| 60-52924 | 8/1985 | Japan. |
| 2045425 | 10/1980 | United Kingdom. |
| 2160971 | 1/1986 | United Kingdom. |

*Primary Examiner*—James P. Trammell
*Assistant Examiner*—Kamini S. Shah
*Attorney, Agent, or Firm*—Fenwick & West LLP

[57] ABSTRACT

A method of monitoring the temperature of a target (4), the method comprising:

a) sensing radiation emitted by the target (4) at at least two different wavelengths;

b) determining a temperature value from the sensed radiation in accordance with a first predetermined algorithm;

c) repeating steps a) and b) a number of times to generate a set of temperature values;

d) selecting a target temperature from the set of temperature values in accordance with a second predetermined algorithm; and, e) generating an output signal defining the target temperature obtained in step d).

11 Claims, 4 Drawing Sheets

METHOD AND APPARATUS FOR NON-CONTACT TEMPERATURE MEASUREMENT

FIELD OF THE INVENTION

The invention relates to methods and apparatus for monitoring the temperature of a target.

DESCRIPTION OF THE PRIOR ART

Methods of measuring the temperature of a body or target, by means of the electro-magnetic radiation emitted by the body, in one or multiple wavebands, are well known. Most of these methods assume that the emitting properties (emissivity) of the body are known and constant. One method, however, using two or more wavebands, can overcome the problem(s) of varying emissivity, provided that there is a fixed relationship between the emissivities at the various wavelengths. In theory, two wavelengths can allow for one variable, three wavelengths for two variables etc. In practice, the cost and complexity increase rapidly with the number of wavebands, and the measurement accuracy decreases rapidly.

An algorithm has been proposed in GB-A-2160971 that facilitates the signal processing. However, applications exist (for example the measurement of liquid metal streams) where the number of variables (e.g. slag particles, stream convolutions, smoke/fume obscuration) make the above, or any other known radiation (not-contact) method impractical or too expensive. For example, in metal streams there exist multiple "interferences" such as cavitation, smoke, gobs of molten refractory and so on which cause the effective emissivity to vary rapidly and unpredictably. However, there is an urgent need to generate an instrument which can monitor the temperature of such liquid metals in place of the conventional, consumable, dip-in type instruments which are labour intensive and expensive.

SUMMARY OF THE INVENTION

In accordance with one aspect of the present invention, a method of monitoring the temperature of a target comprises:

a) sensing radiation emitted by the target at at least two different wavelengths;

b) determining a temperature value from the sensed radiation in accordance with a first predetermined algorithm;

c) repeating steps a) and b) a number of times to generate a set of temperature values;

d) selecting a target temperature from the set of temperature values in accordance with a second predetermined algorithm; and, e) generating an output signal defining the target temperature obtained in step d).

In accordance with a second aspect of the present invention, we provide apparatus for monitoring the temperature of a target comprising means for sensing radiation emitted by the target at at least two different wavelengths; and processing means for carrying out a method according to the first aspect of the invention.

The new method and apparatus overcome the interferences in a cost-effective and practical manner. It usually uses a "dual-wavelength" algorithm as the first predetermined algorithm but also enables the fast response capability of infra-red sensors to be exploited and to capture a large number of readings in a short period of time. This ensemble of readings is then subjected to a statistical analysis (the second predetermined algorithm). The combination of dual-wavelength algorithm and statistical analysis allows true stream temperature to be deduced. This avoids the necessity of predetermining the relationship between the emissivities at the two wavebands, and it pre-selects which of the variables is causing the main errors.

In its simplest form, the method makes use of a single, first predetermined algorithm and for example selects as the target temperature the most commonly occurring temperature value. In other applications, the peak temperature value from the set can be used, or this can be modified with one or two values on either side of the peak. In addition, the values (e.g. one or two) around the peak can be interpolated in accordance with their distribution and in this way obtain a more precise value than the resolution of the temperature values themselves, e.g. ±1° C. with values known to ±5° C.

The invention is particularly suited, however, to a more sophisticated approach which takes account of the different interferences which can exist in flowing, liquid metal streams. In general, these interferences dominate at different times and different algorithms (including different versions of the same algorithm i.e. with different coefficient(s)) need to be applied. Thus, in one preferred approach, the method further comprises for each step a), carrying out steps b) and c) once in accordance with each of a number of different predetermined algorithms whereby a corresponding number of sets of temperature values is generated; and selecting for use in step d) the one of the sets of temperature values which is most consistent.

The different predetermined algorithms are initially determined empirically to deal with the different interferences which can occur and then the method reviews the sets of temperature values obtained from each algorithm and chooses the set which is the most consistent.

Typically, for a dual wavelength approach, each algorithm has the form:

$$1/T = (A+1)/T_1 - A/T_2 + B$$

where

T is the determined temperature value;

$T_1$ and $T_2$ are temperature values derived from the radiation sensed in step a) at the two different wavelengths respectively; and, A,B are constants.

The different interferences are then characterised by different values of the constants A,B.

Preferably, the method further comprises determining the temperature of the target independently (for example using a contact method), and modifying the predetermined algorithm so that the target temperature derived in step d) equals the determined target temperature.

In the case of the algorithm mention above, this correction will typically constitute a correction in the value B.

The invention is applicable to the use of more than two wavelengths with algorithms of the form:

$$1/T = x/T1 + y/T2 + z/T3 + \ldots$$

where x,y,z etc are constants, and T1, T2, T3 are temperature values derived from the radiation sensed in step a) at wavelengths $\lambda_1, \lambda_2, \lambda_3 \ldots$

BRIEF DESCRIPTION OF THE DRAWINGS

Some examples of methods and apparatus according to the invention will now be described with reference to the accompanying drawings, in which.

DETAILED DESCRIPTION OF THE EMBODIMENTS

Figure 1:
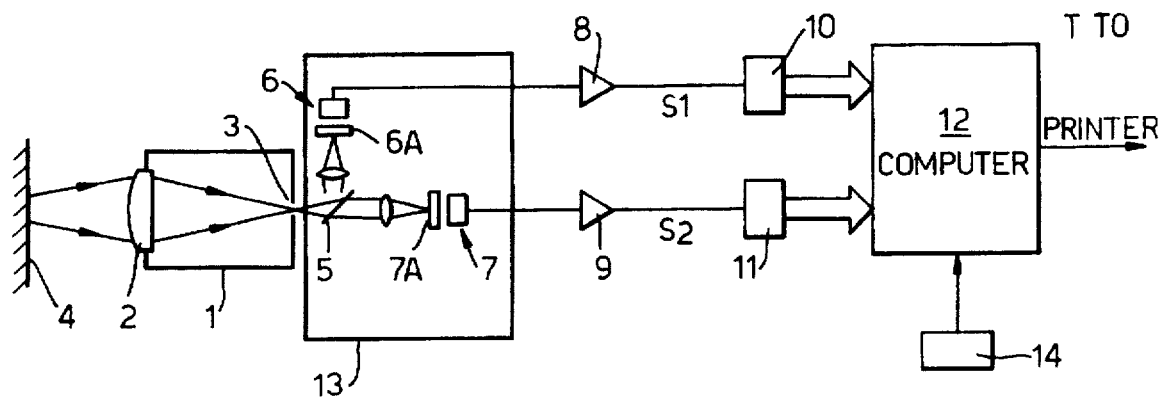
FIG. 1 is a block diagram of the apparatus.

The radiation thermometer is (typically) portable and comprises a conventional radiation pyrometer 1 including a lens 2 which focuses radiation onto a field stop 3. The pyrometer 1 is arranged to receive radiation from a surface 4 such as a flowing metal stream. Radiation passes through the field stop 3 to a detection system shown for convenience as a semi-silvered mirror 5 mounted on a temperature controlled housing 13 and a pair of silicon cell detectors 6,7 to which the radiation passes. Each detector has a filter 6A,7A for passing radiation of a particular waveband centred on infrared wavelengths $\lambda_1$, $\lambda_2$ respectively. Typical wavebands are 0.7–1.0 μm and 0.91–1.1 μm respectively. In the preferred arrangements, however, a dual "sandwich" detection system is used. This has two layers, one above the other. The top layer absorbs (senses) preferentially 0.9–1.1 μm radiation, transmitting 0.7–1.0 μm radiation to be sensed by the bottom layer.

Figure 2:
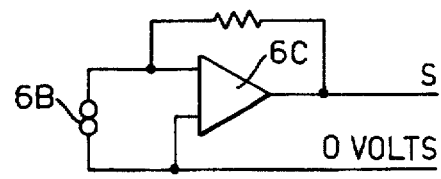
FIGS. 2 and 3 are circuit diagrams of parts of the apparatus shown in FIG. 1.
Figure 3:
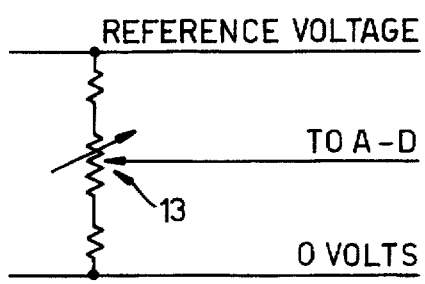

The detector 6 is shown in more detail in FIG. 2. The detector comprises a silicon cell 6B connected to an operational amplifier 6C, the silicon cell 6B generating a current related to the intensity of the incident radiation.

The output signals from the operational amplifiers of the detectors 6,7 are fed to amplifiers 8,9 whose output signals $S_1, S_2$ are fed to conventional analogue-to-digital converters 10,11 where they are regularly sampled and digitized. Digital signals from the converters 10,11, at a rate of between for example 5 and 50000, typically about 1000, readings per second, which are related to the intensities of the incident radiation on the detectors 6,7, are fed to a computer 12. The computer may comprise a suitably programmed microcomputer or be based on a single chip e.g. INTEL 8031, an EPROM for storing the program, or a small RAM.

In order to explain the process carried out by the computer 12, we will firstly explain the background to the invention.

For a dual-wavelength thermometer, we can write:

$$S1 = E1 f1(T) \quad (1)$$

$$S2 = E2 f2(T) \quad (2)$$

where S1,S2 are the signals in the two wavelength channels, E1,E2 are the (effective) emissivities at the two wavelengths, and f1,f2 are the calibration functions at the two wavelengths.

There are two equations in three unknowns (E1,E2,T) which cannot be solved for T without some additional information.

However, if a relationship:

$$E1 = f(E2) \quad (3)$$

can be established, then we have three equations in three unknowns and, provided f( ) meets certain criteria (e.g. single-valuedness) then we can solve for T.

This is the basis of dual-wavelength thermometry and it is necessary to establish (usually empirically) a E1=f(E2) relation.

In principle, the E1=f(E2) relation above can take any form (including E1=f(E1,T)). However, a simple-to-handle form which usefully approximates several measurement situations is:

$$E1 = a E2^b \quad (4)$$

or, equivalently:

$$\ln E1 = b \cdot \ln E2 + \ln a \quad (5)$$

a and b are typically found empirically by fitting experimental data.

From Planck's Law, it is possible to show:

$$1/T - 1/T1 = L1/c2 \cdot \ln E1 \quad (1')$$

$$1/T - 1/T2 = L2/c2 \cdot \ln E2 \quad (2')$$

where T is the true temperature, T1,T2 are "brightness" temperatures at the two wavelengths, and c2 is the "second radiation constant", and L1,L2 are "effective wavelengths" corresponding to $\lambda_1, \lambda_2$ respectively. The effective wavelength of a thermometer is the wavelength of an equivalent (ideal) monochromatic thermometer—i.e. one which matches the calibration function of the actual thermometer over the temperature range of interest.

Brightness temperatures are the temperatures one derives directly from the thermometer signals S1,S2 (using Planck's Law) without any correction for emissivity effects.

Equations 1',2' are just equations 1,2 written in a different way—i.e. where T1,T2 are taken to be the measurands rather than S1,S2. Taken with equation 3, equations 1'.2' form a three-equation, three-unknown system which can be solved for true temperature T.

This representation is useful in practice where the thermometer directly outputs brightness temperatures rather than "radiance" signals S1,S2.

If we take equations 1',2' together with equation 5 we get, with some manipulation:

$$1/T = (A+1) \cdot 1/T1 - A \cdot 1/T2 + B \quad (6)$$

where A=b.L1/(L2−b.L1) and B=A.L2.lna/c2.b and we can solve for T from measured T1,T2 if we know A and B.

We can get the A and B needed in equation 6 in a number of ways, for example we could make a theoretical analysis of the relationship between E1 and E2, hence derive a,b and hence A,B, or we could, similarly, make an empirical study of how E1 relates to E2, hence derive a,b and hence A,B.

However, a very direct and effective way is to simply record T1,T2 in the measurement application over a period of time while also taking "reference" values of true temperature T using, for example, a contact thermometer.

A plot of 1/T−1/T1 versus 1/T1−1/T2 is formed called a "1/T" plot and then a best straight line fit to the data is made, whence the slope and intercept of the line give directly A and B respectively.

An important point to recognise is that a straight line relation in the 1/T plot is not essential to the method. A straight line follows from equation 6, which follows from equation 5—i.e. the log-linear assumption. However, provided the empirical data forms a single-valued relation in the 1/T plot then the plot can be used directly to relate T to measured T1,T2 without any a prior assumption about the form of the E1=f(E2) relation.

Thus, we have a purely empirical method: T1,T2,T data is collected (e.g. during system commissioning) and points entered into a 1/T plot. Any promising function is then used to fit the data and hence permit calculation of T from future measured T1,T2.

This approach which is also described in GB-A-2160971 works successfully and it is found that once an empirical 1/T relation is established it is stable and may be used over many months without adjustment.

For a metal stream, the situation can be more complex. We have found that a 1/T relation can be established which correctly accounts for the (E1=f(E2)) behaviour of one interference (e.g. cavitation) but that other interferences occur, in a fluctuating manner, which are not correctly described by this 1/T relation.

If one interference is dominant then the result is a predominance of readings that fall on a line (not necessarily straight) in the 1/T plot but with a scatter of readings on either side of this line.

One can exploit the fast response of the thermometer to take readings in large ensembles (e.g. a thousand T1,T2 values in a one second interval). This allows one to use internal consistency to select those readings which are subject to only the single (modelled) interference and reject those that are subject to multiple interferences.

This can work as follows:

From theoretical and/or empirical studies, it is decided that interference "X" is dominant. We further establish a 1/T relation which models interference "X".

Conveniently (but not necessarily) let us assume that this 1/T relation turns out to be a straight line—i.e. our modelling gives us A and B values as per equation (6).

Figure 4:
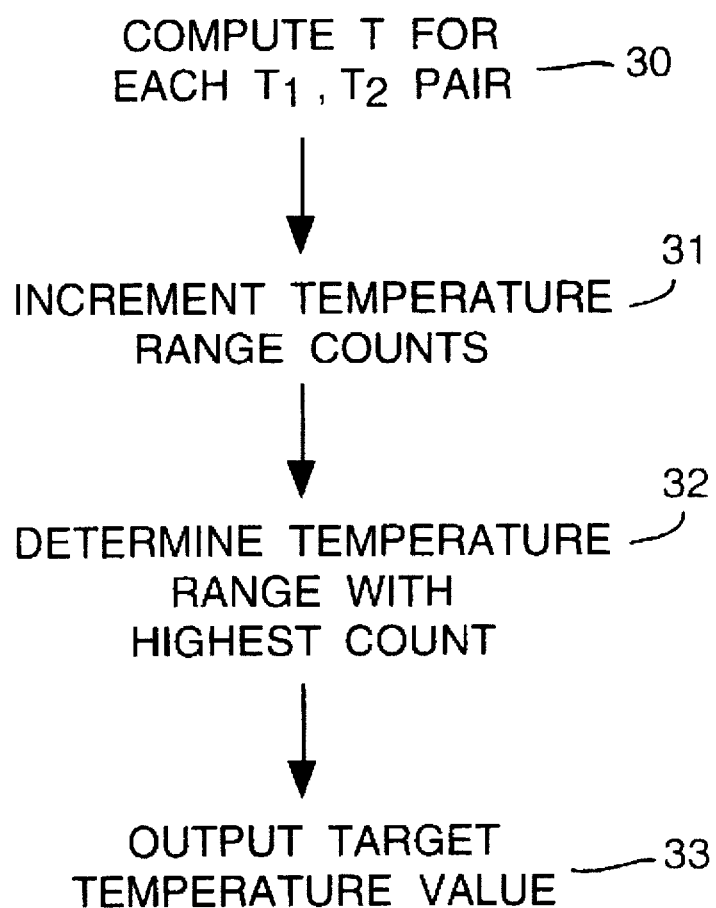
FIG. 4 is a flow diagram illustrating one example of the operation of the computer.

Initially, the computer determines from the sensed intensity pairs S1,S2, equivalent radiance pairs $T_1,T_2$ using a conventional "linearisation" routine. In this example, illustrated in the flow diagram form in FIG. 4, the computer 12 then computes from each of the 1000 $T_1,T_2$ pairs a temperature T using equation 6 (step 30). The values of T are then grouped into respective temperature ranges, for example 5 celsius intervals, by incrementing respective counts depending upon each value of T which is obtained in step 30. (Step 31.)

Figure 5:
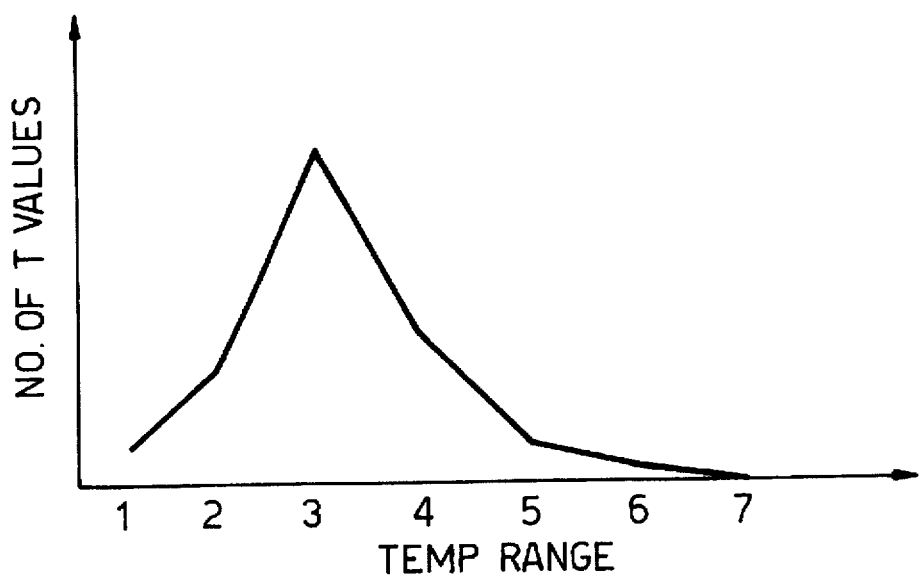
FIG. 5 illustrates graphically a function resulting from the example of FIG. 4; and, FIGS. 6 and 7 are similar to FIGS. 4 and 5 but of a second example.

This results in a set of counts, an example of which is indicated graphically in FIG. 5. In this Figure, seven temperature ranges are defined centred on respective temperatures (defined along the horizontal axis) while the number of values falling within each temperature range is plotted on the vertical axis. In a step 32, the computer 12 determines the temperature range with the most T values, in this case temperature range 3, and outputs (step 33) to a display or printer (not shown) the mean temperature value of that temperature range. Alternatively, the value may be converted back to analogue form and used for control purposes or the like. In other methods, as described above, account can be taken of the number of occurrences of temperature values in one or two ranges on either side of the peak range and the mean temperature of the peak range modified accordingly.

In a more sophisticated approach, the computer 12 will also consider the quality of the resultant distribution as shown in FIG. 5 and if it is not acceptable will not output a temperature value at all. Thus, the computer 12 may require that the distribution has a single peak, a minimum "sharpness" and show a measure of symmetry.

In the example described above, it is assumed that the dominant interference was known and that the algorithm used is satisfactory for that interference.

Figure 7:
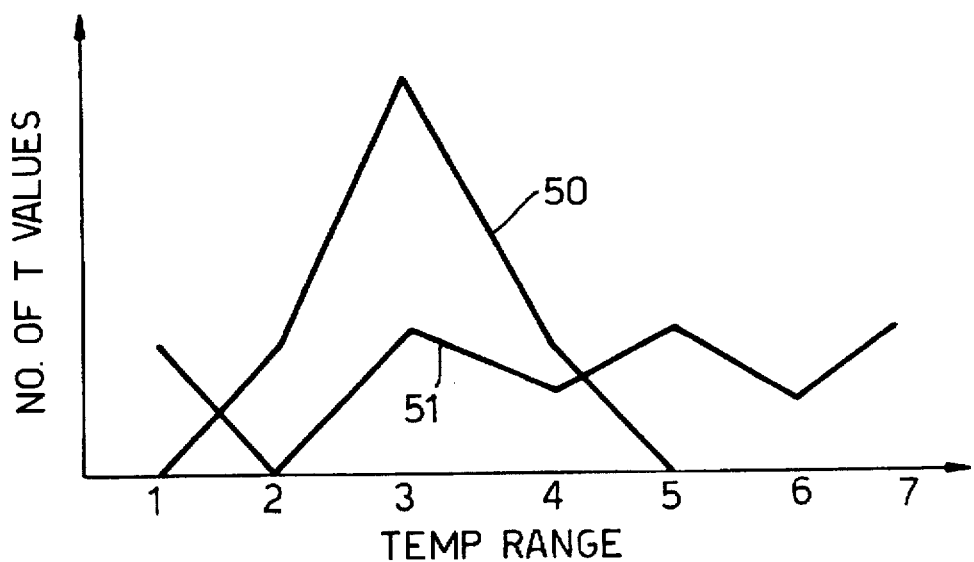

This is not essential, however, and in the example to be described below, the instrument is able to deal with an unknown interference. This is achieved by preloading the computer with a number of different predetermined algorithms all having the form of equation (6) above but with different values of A and/or B which have been determined empirically to be satisfactory for interferences such as cavitation, smoke, etc. This example will now be described with reference to FIGS. 6 and 7.

Figure 6:
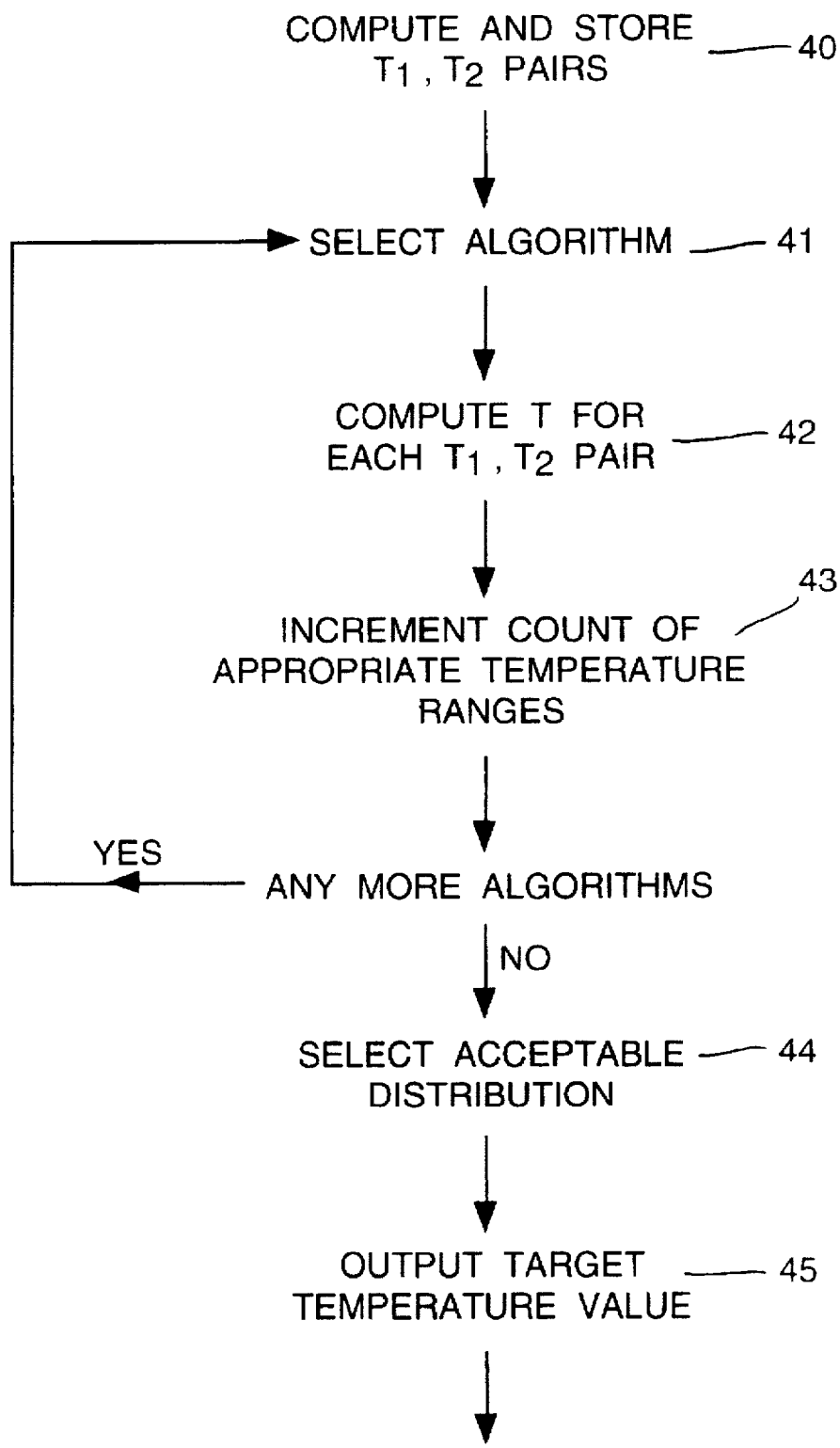

As shown in FIG. 6, initially, the computer computes and stores the values $T_1,T_2$, as before (step 40). One of the prestored algorithms is then selected (step 41) and then for each $T_1,T_2$ pair a value T is determined using the selected algorithm (step 42) and the resultant value used to increment the count of a corresponding temperature range as in the example described above (step 43). This process is then repeated for each of the algorithms until there is a set of counts for each algorithm. This is indicated graphically in FIG. 7. For clarity, just two distributions (corresponding to two algorithms) have been shown in FIG. 7, labelled 50,51.

The computer then reviews (step 44) the resultant distributions 50,51 and discards any which does not satisfy predetermined criteria. For example, the distribution 51 would be discarded because it exhibits more than one peak. The distribution 50 is acceptable since it exhibits a single peak and is generally symmetrical about the peak. The mean temperature value of the temperature range having the most T values (or some other related value) is then output (step 45) as before.

This selection between distributions depends in practice on how sensitive the frequency distribution shape is to the different interference models. We have found in practice that using the log-linear approximation (equation (6)) the shape of the distribution is quite sensitive to the value A but generally insensitive to B. This indicates that a practical instrument can be produced where the value A is derived automatically by optimising the shape of the distribution but B is derived in a different manner, for example by comparison with reference temperature reading of obtained with a dip-type thermometer. In this connection, in some cases, the user can periodically take the temperature of the stream using a dip-type thermometer and then enter this value via an input device such as a keyboard 14, the computer then responding to this input to modify the value B so that the determined temperature accords with the input temperature. This might occur, for example, once or twice per day.

I claim:

1. A method of monitoring the temperature of a target, the method comprising:
   a) sensing radiation emitted by said target at at least two different wavelengths;
   b) determining a temperature value from said sensed radiation in accordance with a first predetermined algorithm;
   c) repeating steps a) and b) a number of times to generate a set of temperature values and allocating each temperature value to one of a set of temperature value ranges;
   d) selecting the temperature value range to which most temperature values have been allocated and determining a target temperature in accordance with a second predetermined algorithm in which a temperature related to said selected temperature value range is modified in accordance with the distribution of temperature values in adjacent temperature value ranges; and,
   e) generating an output signal defining the target temperature obtained in step d).

2. A method according to claim 1, wherein step a) and b) are repeated at substantially 1000 times or more per second.

3. A method according to claim 1, wherein said target comprises a flowing liquid stream.

4. A method according to claim 1, wherein each temperature value range spans ±5° C.

5. Apparatus for monitoring the temperature of a target, the apparatus comprising radiation sensing means for sensing radiation emitted by the target; and processing means connected to said radiation sensing means for
   a) sensing radiation emitted by said target at at least two different wavelengths;
   b) determining a temperature value from said sensed radiation in accordance with a first predetermined algorithm;
   c) repeating steps a) and b) a number of times to generate a set of temperature values and allocating each temperature value to one of a set of temperature value ranges;
   d) selecting the temperature value range to which most temperature values have been allocated and determining a target temperature in accordance with a second predetermined algorithm in which a temperature related to said selected temperature value range is modified in accordance with the distribution of temperature values in adjacent temperature value ranges; and,
   e) generating an output signal defining the target temperature obtained in step d).

6. A method of monitoring the temperature of a target, the method comprising:
   a) sensing radiation emitted by said target at at least two different wavelengths;
   b) determining a temperature value from said sensed radiation in accordance with a first predetermined algorithm;
   c) repeating steps a) and b) a number of times to generate a set of temperature values and allocating each temperature value to one of a set of temperature value ranges;
   d) selecting the temperature value range to which most temperature values have been allocated and determining a target temperature in accordance with a second predetermined algorithm in which a temperature related to said selected temperature value range is modified in accordance with the values of and number of occurrences of temperature values in adjacent temperature value ranges; and,
   e) generating an output signal defining the target temperature obtained in step d).

7. A method of monitoring the temperature of a target, the method comprising:
   a) sensing radiation emitted by said target at at least two different wavelengths;
   b) determining a temperature value from said sensed radiation in accordance with a first predetermined algorithm;
   c) repeating steps a) and b) a number of times to generate a set of temperature values and allocating each temperature value to one of a set of temperature value ranges;
   d) determining a target temperature as the mean value of the temperature value range to which most temperature values have been allocated; and,
   e) generating an output signal defining the target temperature obtained in step d).

8. A method of monitoring the temperature of a target, the method comprising:
   a) sensing radiation emitted by said target at at least two different wavelengths;
   b) determining a set of temperature values from said sensed radiation in accordance with a number of different ones of a first predetermined algorithm, each temperature value corresponding to each different first predetermined algorithm;
   c) repeating steps a) and b) a number of times to generate a number of sets of temperature values;
   d) selecting one of said number of sets of temperature values which satisfies predetermined valid criteria and allocating each temperature value of said selected set to one of a set of temperature value ranges;
   e) determining a target temperature by selecting one of said set of temperature value ranges in accordance with a second predetermined algorithm, said determined target temperature being related to said selected temperature value range; and,
   f) generating an output signal defining the target temperature obtained in step e).

9. A method according to claim 8, wherein said predetermined valid criteria require a set of temperature values to exhibit one or more of a single peak, a minimum sharpness, and symmetry.

10. A method of monitoring the temperature of a target, the method comprising:
    a) sensing radiation emitted by said target at at least two different wavelengths;
    b) determining a temperature value from said sensed radiation in accordance with a first predetermined algorithm;
    c) repeating steps a) and b) a number of times to generate a set of temperature values and allocating each temperature value to one of a set of temperature value ranges;
    d) determining a target temperature by selecting one of said set of temperature value ranges in accordance with a second predetermined algorithm, said determined target temperature being related to said selected temperature value range;
    e) generating an output signal defining the target temperature obtained in step d; and,
    f) periodically determining an independent temperature of said target independently, and modifying said first predetermined algorithm so that said target temperature derived in step d) equals said independent temperature.

11. A method of monitoring the temperature of a target, the method comprising:
    a) sensing radiation emitted by said target at at least two different wavelengths;
    b) determining a temperature value from said sensed radiation in accordance with a first predetermined algorithm having the form:

$$1/T = (A+1)/T_1 - A/T_2 + B$$

where

T is the determined temperature value;

$T_1$ and $T_2$ are temperature values derived from the radiation sensed in step a) at the two different wavelengths respectively; and, A, B are constants;

c) repeating steps a) and b) a number of times to generate a set of temperature values and allocating each temperature value to one of a set of temperature value ranges;
    d) determining a target temperature by selecting one of said set of temperature value ranges in accordance with a second predetermined algorithm, said determined target temperature being related to said selected temperature value range; and,
    e) generating an output signal defining the target temperature obtained in step d).

* * * * *